(12) United States Patent
Cheong et al.

(10) Patent No.: US 11,487,917 B2
(45) Date of Patent: Nov. 1, 2022

(54) AUTOMATIC DESIGN OF MECHANICAL ASSEMBLIES USING ESTIMATION OF DISTRIBUTION ALGORITHM

(71) Applicant: AUTODESK, INC., San Francisco, CA (US)

(72) Inventors: Hyunmin Cheong, Toronto (CA); Mehran Ebrahimi, Toronto (CA); Adrian Butscher, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 428 days.

(21) Appl. No.: 16/434,085

(22) Filed: Jun. 6, 2019

(65) Prior Publication Data

US 2020/0334337 A1    Oct. 22, 2020

Related U.S. Application Data

(60) Provisional application No. 62/837,156, filed on Apr. 22, 2019.

(51) Int. Cl.
*G06F 30/20* (2020.01)
*G06F 17/18* (2006.01)
(Continued)

(52) U.S. Cl.
CPC .............. *G06F 30/20* (2020.01); *G06F 17/18* (2013.01); *G06N 7/005* (2013.01); *G06F 30/367* (2020.01);
(Continued)

(58) Field of Classification Search
CPC ...... G06F 30/20; G06F 17/18; G06F 2119/18; G06F 30/23; G06N 7/005
See application file for complete search history.

(56) References Cited

U.S. PATENT DOCUMENTS 6,963,824 B1    11/2005  Davidson et al.
8,285,522 B1 *  10/2012  Tryon, III ............... G06F 30/23
                                                      703/2
(Continued)

FOREIGN PATENT DOCUMENTS

WO    2009/011762 A1    1/2009
WO    WO-2018032052 A1 *  2/2018

OTHER PUBLICATIONS

Suh, N. P., "The Principles of Design", Oxford University Press, 1990, pp. 243-246.
(Continued)

*Primary Examiner* — Thai Q Phan
(74) *Attorney, Agent, or Firm* — Artegis Law Group, LLP

(57) ABSTRACT

A design engine implements a probabilistic approach to generating designs for computer-aided design (CAD) assemblies. The design engine initially generates a population of designs based on a problem definition associated with a design problem. Each design includes a randomly-generated set of design values assigned to various design variables. The design engine repairs any infeasible designs in the population of designs and then executes a dynamic simulation with the population of designs. The design engine selects the most performant designs and identifies, based on those performant designs, design variables that are dependent on one another. The design engine generates a probability model indicating conditional probabilities between design values associated with dependent design variables. The design engine then iteratively samples the probability model to generate a subsequent population of designs. In this manner, the design engine can automatically generate designs for mechanical assemblies significantly faster than possible with conventional algorithmic design techniques.

20 Claims, 10 Drawing Sheets

(51) Int. Cl.
*G06N 7/00* (2006.01)
*G06F 119/18* (2020.01)
*G06F 30/367* (2020.01)
*G06F 30/398* (2020.01)

(52) U.S. Cl.
CPC ........ *G06F 30/398* (2020.01); *G06F 2119/18* (2020.01)

(56) References Cited

U.S. PATENT DOCUMENTS

| | | | |
|---|---|---|---|
| 9,336,302 B1* | 5/2016 | Swamy | G06F 16/355 |
| 9,953,108 B2 | 4/2018 | Santiquet et al. | |
| 10,254,941 B2 | 4/2019 | Bowen | |
| 10,330,018 B2* | 6/2019 | Stillinger | G06N 7/005 |
| 10,346,005 B2 | 7/2019 | Delfino et al. | |
| 10,628,532 B2 | 4/2020 | Cheong et al. | |
| 10,796,266 B2 | 10/2020 | Lamkin et al. | |
| 2007/0198971 A1* | 8/2007 | Dasu | G06F 30/30 717/140 |
| 2008/0172208 A1 | 7/2008 | Lechine | |
| 2009/0319453 A1 | 12/2009 | Goel | |
| 2010/0004769 A1 | 1/2010 | Holden et al. | |
| 2010/0010655 A1 | 1/2010 | Corcoran et al. | |
| 2010/0083200 A1* | 4/2010 | Song | G06F 30/367 716/106 |
| 2013/0226544 A1* | 8/2013 | Mcconaghy | G06F 30/398 703/2 |
| 2015/0324494 A1 | 11/2015 | Iorio et al. | |
| 2017/0024511 A1 | 1/2017 | Cheong et al. | |
| 2017/0024647 A1 | 1/2017 | Cheong et al. | |
| 2017/0072641 A1 | 3/2017 | Grivetti | |
| 2017/0076013 A1 | 3/2017 | Grivetti | |
| 2018/0089575 A1 | 3/2018 | Cheong et al. | |
| 2018/0299868 A1 | 10/2018 | Grafen et al. | |
| 2018/0336289 A1 | 11/2018 | Benjamin et al. | |
| 2019/0197198 A1 | 6/2019 | Cheong et al. | |
| 2019/0213300 A1 | 7/2019 | Cheong et al. | |
| 2019/0286786 A1 | 9/2019 | Ebrahimi et al. | |

OTHER PUBLICATIONS

Mittal et al., "Towards a Generic Model of Configuraton Tasks," IJCAI, vol. 89, 1989, pp. 1395-1401.
Baluja, Shumeet, "Population-Based Incremental Learning: a method for integrating genetic search based function optimization and competitive learning," Technical Report, No. CMU-CS-94-163. Carnegie-Mellon University of Pittsburgh, Dept of Computer Science, Jun. 2, 1994, 41 pages.
Bonet et al., "MIMIC: Finding optima by estimating probability densities," Advances in Neural Information Processing Systems, 1997, pp. 424-430.
Harik et al., "The compact genetic algorithm," IEEE Transactions on Evolutionary Computation, vol. 3, No. 4, Nov. 1999, pp. 287-297.
Harik et al., "Linkage Learning via Probabilistic Modeling in the Extended Compact Genetic Algorithm (ECGA)," Scalable Optimization via Probabilistic Modeling, Studies in Computational Intelligence, vol. 33. Berlin, Heidelberg, Springer, 2006, pp. 39-61.
Pelikan et al., "The Bivariate Marginal Distribution Algorithm," Advances in Soft Computing. London: Springer, 1999, pp. 521-535.
Pelikan et al., "BOA: The Bayesian Optimization Algorithm", Proceedings of the Genetic and Evolutionary Computation Conference, 1999, 8 pages.
Santana, Roberto, "Estimation of Distribution Algorithms with Kikuchi Approximations," Evolutionary Computation, vol. 13, No. 1, 2005, pp. 67-97.
Lima et al., "Substructural neighborhoods for local search in the Bayesian optimization algorithm," Parallel Problem Solving from Nature-PPSN IX Berlin, Heidelberg: Springer, 2006, pp. 232-241.

Shakya et al., "Optimization by Estimation of Distribution with DEUM Framework Based on Markov Random Fields," International Journal of Automation and Computing, vol. 4, No. 3, 2007, pp. 262-272.
Shakya et al., "A markovianity based optimisation algorithm," Genetic Programming and Evolvable Machines, vol. 13, No. 2, 2012, pp. 159-195.
Alden et al., "MARLEDA: Effective distribution estimation through markov random fields," Theoretical Computer Science, vol. 633, 2016, pp. 4-18.
Martins et al., "On the performance of multi-objective estimation of distribution algorithms for combinatorial problems," IEEE Congress on Evolutionary Computation (CEC), 2018, 8 pages.
Coello, Carlos A. "Theoretical and numerical constraint-handling techniques used with evolutionary algorithms: a survey of the state of the art," Computer Methods in Applied Mechanics and Engineering, vol. 191, No. 11-12, 2002, pp. 1245-1287.
Angelov et al., "Automatic design synthesis and optimization of component-based systems by evolutionary algorithms," Proceedings of the Genetic and Evolutionary Computation Conference, 2003, pp. 1938-1950.
Grignon et al., "A GA based configuration design optimization method," Journal of Mechanical Design, vol. 126, No. 1, Jan. 2004, pp. 6-15.
Chapman et al., "Genetic algorithms as an approach to configuration and topology design," Journal of Mechanical Design, vol. 116, No. 4, 1994, pp. 1005-1012.
Tanie et al., "Topology and shape optimization of continuum structures using GA and BEM," Structural Optimization, vo. 17, No. 2-3, 1999, pp. 130-139.
Auling et al., "State-based representation for structural topology optimization and application to crashworthiness," IEEE Congress on Evolutionary Computation (CEC), 2016, pp. 1642-1649.
Guirguis et al., "An Evolutionary Multi-Objective Topology Optimization Framework for Welded Structures," IEEE Congress on Evolutionary Computation (CEC), 2016, pp. 372-378.
Islam et al., "Multimodal truss structure design using bilevel and niching based evolutionary algorithms," Proceedings of the Genetic and Evolutionary Computation Conference, Jul. 15-19, 2017, pp. 274-281.
Wu et al., "Integrated discrete and configuration optimization of trusses using genetic algorithms," Computers & Structures, vol. 55, No. 4, 1995, pp. 695-702.
D'Souza et al., "A genetic algorithm based method for product family design optimization," Engineering Optimization, vol. 35, No. 1, 2010, pp. 1-18.
Choubey et al., "Solving a fixture configuration design problem using genetic algorithm with learning automata approach," International Journal of Production Research, vol. 43, No. 22, 2005, pp. 4721-4743.
Shirahtt et al., "Optimal design of passenger car suspension for ride and road holding," Journal of the Brazilian Society of Mechanical Sciences and Engineering, vol. 30, No. 1, Jan.-Mar. 2008, pp. 66-76.
Arikere et al., "Optimisation of Double Wishbone Suspension System Using Multi-Objective Genetic Algorithm" Lecture Notes in Computer Science, vol. 6457, 2010, pp. 445-454.
Simionescu et al., "Teeth-Number Synthesis of a Multispeed Planetary Transmission Using an Estimation of Distribution Algorithm," Journal of Mechanical Design, vol. 128, No. 1, Jan. 2006, pp. 108-115.
Sun et al., "A hybrid estimation of distribution algorithm for cdma cellular system design," International Journal of Computational Intelligence and Applications, vol. 7, No. 2, 2008, pp. 187-200.
Zhong et al., "A Robust Estimation of Distribution Algorithm for Power Electronic Circuits Design," Proceedings of the Genetic and Evolutionary Computation Conference, Jul. 7-11, 2010, pp. 319-326.
Deb et al., "Towards Optimal Ship Design and Valuable Knowledge Discovery Under Uncertain Conditions", IEEE Congress on Evolutionary Computation (CEC), 2015, 8 pages.
Greenwood et al., "Guide to Tables in Mathematical Statistics", Princeton, New Jersey: Princeton University Press, 1962, pp. 130.

(56) References Cited

OTHER PUBLICATIONS

Brown et al., "Exploring the use of constraint programming for enforcing connectivity during graph generation," In The 5th Workshop on Modelling and Solving Problems with Constraints (held at IJCAI05), 2005, 6 pages.
Ebrahimi et al., "Design optimization of dynamic flexible multibody systems using the discrete adjoint variable method," Computers and Structures, 2018, 18 pages.
Zhang et al., "Comparison of Selection Methods for Evolutionary Optimization," Evolutionary Optimization, vol. 2, No. 1, 2000, pp. 55-70.
Gaur et al., "Finding near-optimum and diverse solutions for a large-scale engineering design problem," IEEE Symposium Series on Computational Intelligence, 2017, 8 pages.
Non-Final Office Action received for U.S. Appl. No. 16/434,082, dated Apr. 16, 2020, 8 pages.
Sourceforce.net, freecad-015.pdf manual dated Mar. 21, 2015 (Year: 2015).
Final Office Action received for U.S. Appl. No. 16/434,082, dated Oct. 28, 2020, 19 pages.
International Search Report for application No. PCT/US2020/029312 dated Jul. 31, 2020.

\* cited by examiner

342

|  | X21 | X22 | X23 | ... |
|---|---|---|---|---|
| X11 | P0 | P1 | P2 | ... |
| X12 | P3 | P4 | P5 | ... |
| X13 | P6 | P7 | P8 | ... |
| | ⋮ | ⋮ | ⋮ | ⋱ |

FIG. 7

AUTOMATIC DESIGN OF MECHANICAL ASSEMBLIES USING ESTIMATION OF DISTRIBUTION ALGORITHM

CROSS-REFERENCE TO RELATED APPLICATIONS

This application claims the priority benefit of U.S. provisional patent application titled, "Generative Design of Mechanical Assemblies Using Estimation of Distribution Algorithm," filed on Apr. 22, 2019 and having Ser. No. 62/837,156. The subject matter of this related application is hereby incorporated herein by reference.

BACKGROUND

Field of the Various Embodiments

Embodiments of the present invention relate generally to computer-aided design technology and, more specifically, to automatic design of mechanical assemblies using estimation of distribution algorithm.

Description of the Related Art

In a typical mechanical engineering and design workflow, a designer uses a computer-aided design (CAD) application to generate CAD models that represent mechanical components. The designer also can use the CAD application to combine two or more CAD models to generate a CAD assembly. The CAD models included in the CAD assembly are typically coupled together in a manner that achieves a particular function to address a specific design problem. For example, a CAD assembly that represents an automobile transmission could include a collection of CAD models representing gears that are coupled together to provide torque conversions. The design problem addressed in this example would be the need to transmit torque from the automobile crankshaft to the wheels of the automobile.

Generating a CAD assembly using a CAD application is typically a manually-performed, multi-step process. Initially, a designer formulates the design problem to be addressed by the CAD assembly by determining a set of design objectives the CAD assembly should meet. For example, when formulating the above-mentioned automobile transmission design problem, the designer could determine that the transmission should implement a specific conversion ratio in order to convert an input torque received from the automobile crankshaft to an output torque that is applied to the wheels of the automobile. In conjunction with determining the set of design objectives, the designer may further define the design problem by determining a set of design constraints that the CAD assembly should not violate. In the transmission design problem discussed above, for example, the designer could determine that the mass of the transmission should not exceed a particular value. Once the designer determines the various design objectives and design constraints, the designer can then use the CAD application to generate the CAD assembly by manually generating and combining a set of different CAD models. For example, the transmission designer could determine a specific arrangement of CAD models representing a selected set of gears to generate a CAD assembly that implements the desired conversion between input and output torques.

As previously mentioned, through the above design process, the designer generates a CAD assembly that is meant to address a particular design problem. Once generated, the designer can further test the CAD assembly, via computer simulation, to determine whether the various design objectives are met without violating the different constraints. The design process is usually repeated iteratively, in a trial-and-error fashion, in an attempt to explore the overall design space associated with the particular design problem and produce one or more successful designs.

Conventional design processes, like the process set forth above, can be automated to a certain extent using various algorithmic techniques. For example, generative design techniques can be implemented to automatically generate CAD assemblies that meet design objectives without violating design constraints. Alternatively, constraint-based programming techniques can be implemented to identify feasible CAD assemblies that address stated design objectives to varying degrees. Such algorithmic techniques streamline the design process by reducing the number of manual operations that have to be performed by the designer.

One drawback of implementing algorithmic techniques in the design process is that those techniques typically explore the design space in an exhaustive fashion, which can consume inordinate amounts of time. Consequently, implementing algorithmic techniques does not necessarily streamline the design process. This problem is exacerbated when algorithmic techniques are applied to complex design problems having numerous design variables. In such situations, the design space can become quite large, and the algorithmically-generated CAD assemblies can be correspondingly complex. As a result, the algorithmic techniques can end up consuming even greater amounts of time when generating viable CAD assemblies that address a complex design problem.

As the foregoing illustrates, what is needed in the art are more effective techniques for designing mechanical assemblies.

SUMMARY

Various embodiments include computer-implemented method for generating designs that address a design problem, including generating a first plurality of designs that is based on a problem definition associated with the design problem and includes a first set of design values, generating a first model that indicates a first probability distribution associated with the first set of design values and is based on the first plurality of designs, and generating a second plurality of designs based on one or more samples extracted from the first model, wherein the second plurality of designs includes a greater number of designs that meet a first design objective set forth in the problem definition than the first population of designs.

At least one technological advantage of the disclosed techniques relative to the prior art is that complex CAD assemblies that address complex design problems can be automatically generated faster than when generated using conventional algorithmic techniques.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

FIG. 7 is an example of the probability model of FIG. 3, according to various embodiments;

DETAILED DESCRIPTION

Figure 1:
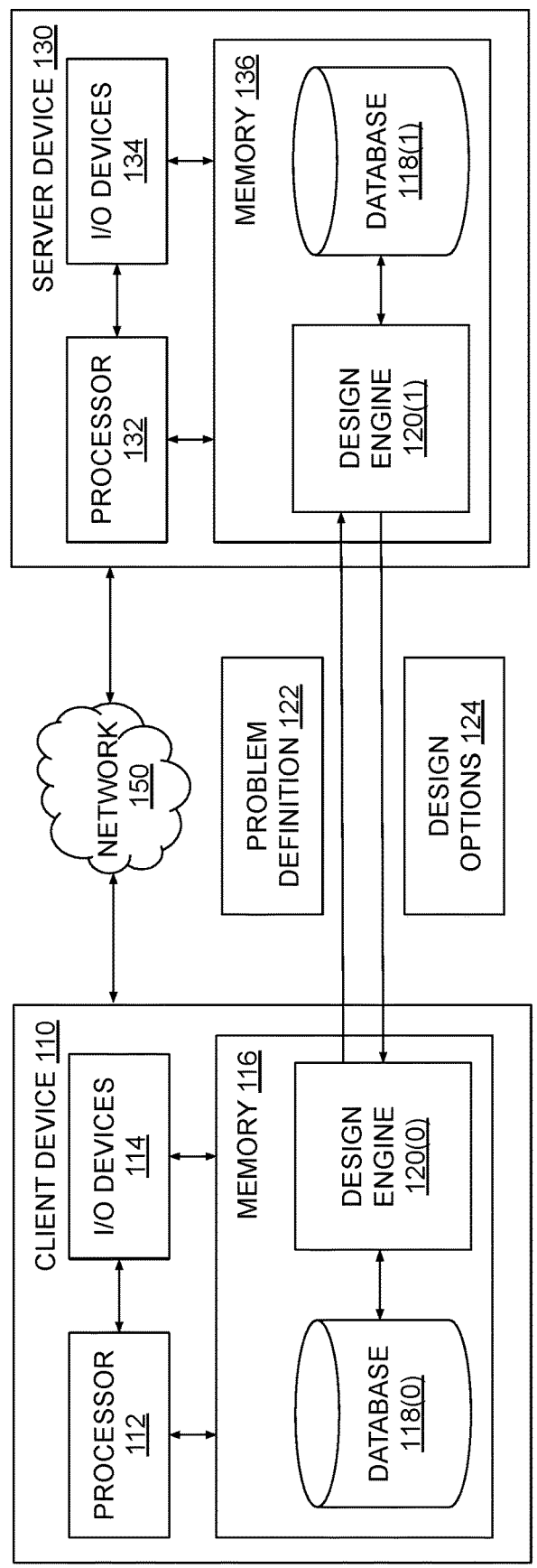
- FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, conventional algorithmic techniques for generating CAD assemblies typically operate too slowly to act as a viable alternative to traditional manually-performed design processes, especially in situations where complex design problems merit the design of complex CAD assemblies.

To address these issues, various embodiments include a design engine that implements a probabilistic approach to generating designs for CAD assemblies. The design engine initially generates a population of designs based on a problem definition associated with a design problem. The problem definition sets forth various design variables that can be assigned specific values to represent different design elements, including mechanical joint elements and mechanical component elements. Each design in the initial population of designs includes a randomly-generated set of design values assigned to the various design variables. Using a constraint-oriented programming technique, the design engine repairs any infeasible designs included in the population of designs. The design engine then executes a dynamic simulation with each design included in the population of designs to generate performance data. The performance data indicates the degree to which the various designs meet one or more design objectives set forth in the problem definition. The design engine ranks the designs based on the performance data and selects the best performing or most performant designs included in the population of designs.

Based on the selected designs, the design engine generates a probability model that indicates various conditional probabilities between specific values of the various design variables. The design engine generates the probability model by first establishing statistical dependencies between design variables and then computing conditional probabilities between specific design values that can be assigned to those design variables. The design engine then generates a subsequent population of designs based on the probability model. Each design in the subsequent population of designs includes a set of design values that are generated based on samples extracted from the probability model. The design engine performs the above process iteratively to generate increasingly performant populations of design options.

At least one technological advantage of the disclosed techniques relative to the prior art is that complex CAD assemblies that address complex design problems can be automatically generated faster than when generated using conventional algorithmic techniques. Another technological advantage of the disclosed techniques relative to the prior art is that large design spaces associated with complex design problems can be more efficiently explored without consuming the large amounts of time that are typical with conventional algorithmic techniques that oftentimes perform exhaustive design space searches. As a result, the disclosed techniques can be applied to a wider range of design problems than conventional algorithmic techniques. These technological advantages represent one or more technological advancements over prior art approaches.

System Overview

FIG. 1 illustrates a system configured to implement one or more aspects of the various embodiments. As shown, a system 100 includes one or more clients 110 and one or more servers 130 coupled together via a network 150. A given client 110 or a given server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118 and a design engine 120(0). Design engine 120(0) is a software application that, when executed by processor 112, interoperates with a corresponding software application executing on server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(0) and a design engine 120(1). Design engine 120(1) is a software application that, when executed by processor 132, interoperates with design engine 120(0).

As a general matter, database 118(0) and 118(1) represent separate portions of a distributed storage entity. Thus, for simplicity, databases 118(0) and 118(1) are collectively referred to hereinafter as database 118. Similarly, design engine 120(0) and design engine 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to generate a problem definition 122 based on interactions with a user. Problem definition 122 includes various data that defines, at least in part, an engineering problem to be addressed by a mechanical assembly. For example, problem definition 122 could include geometry associated with the engineering problem, a set of design objectives associated with the engineering problem, and/or a set of design constraints associated with the engineering problem, among others. An exemplary problem definition is described below in conjunction with FIG. 2A. Based on problem definition 122, design engine 120 generates one or more design options 124. Each design option 124 defines a CAD assembly that addresses, at least to some degree, the engineering problem defined via problem definition 122. An exemplary design option 124 is described below in conjunction with FIG. 2B.

Exemplary Problem Definition and Corresponding Design Option

Figure 2A:
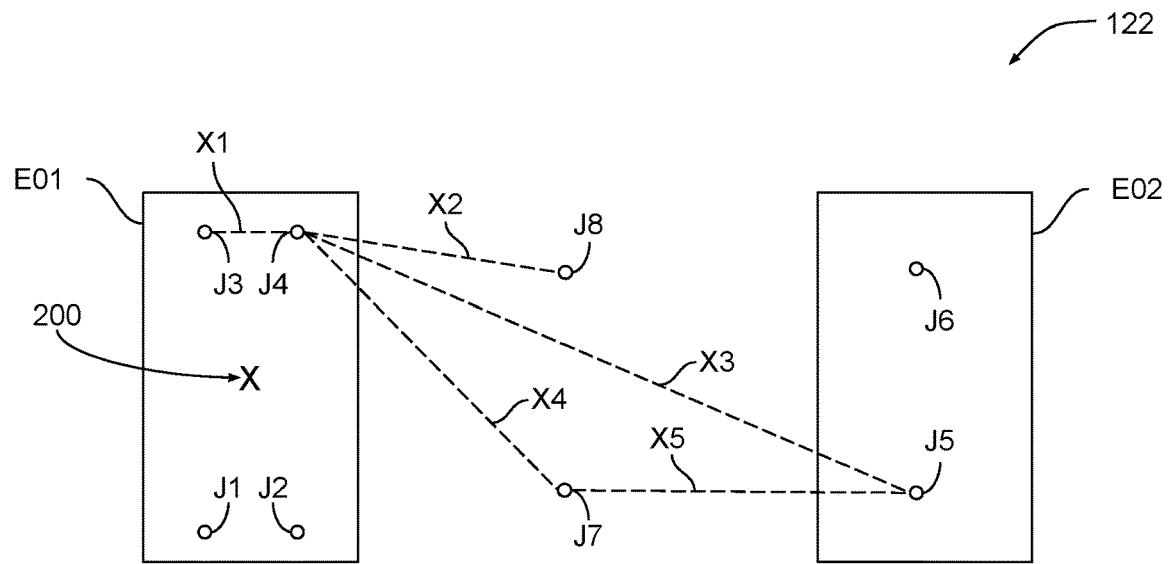
FIG. 2A is an example of the design problem of FIG. 1, according to various embodiments.

FIG. 2A is an example of the design problem of FIG. 1, according to various embodiments. As shown, design problem 122 includes an environmental object 1 (EO1), an environmental object 2 (EO2), joints J1 through J8, design variables X1 through X5, and design objective 200. EO1 and EO2 represent pre-existing 3D geometry associated with the engineering problem. In the example shown, EO1 could be the chassis of an automobile, while EO2 could be a wheel of the automobile that needs to be coupled to the automobile chassis by a mechanical assembly of some sort.

Joints J1 through J8 represent specific points to which components can be coupled to generate CAD assemblies. Those components could include beams, springs, dampers, and so forth. A given joint can be assigned a specific joint type, although a specific assignment of joint type can be omitted. Joints J1 through J8 are initially positioned by the user via interactions with design engine 120. The user can also define, via interactions with design engine 120, one or more design objectives, such as design objective 200. Design objective 200 defines a target set of dynamics that a given CAD assembly should achieve at an exemplary location on EO1 corresponding to design objective 200. For example, design objective 200 could define a target time-varying acceleration that a given CAD assembly should achieve at the location on EO1 corresponding to design objective 200. Design problem 122 can include any number of design objectives associated with any set of positions.

Design problem 122 can also include one or more design objectives that are not associated with any particular position. For example, a given design objective could indicate that the total number of components should be minimized.

Design variables X1 through X5 represent exemplary design variables to which design engine 120 assigns specific values when generating a design. The value assigned to a given design variable may be referred to herein as a "design value." In practice, design engine 120 implements a different design variable for each different pair of joints, although for clarity only exemplary design variables X1 through X5 are shown. Design engine 120 assigns a given design value to a given design variable to represent a specific component type that can couple together two joints, as described in greater detail below in conjunction with FIG. 2B.

Figure 2B:
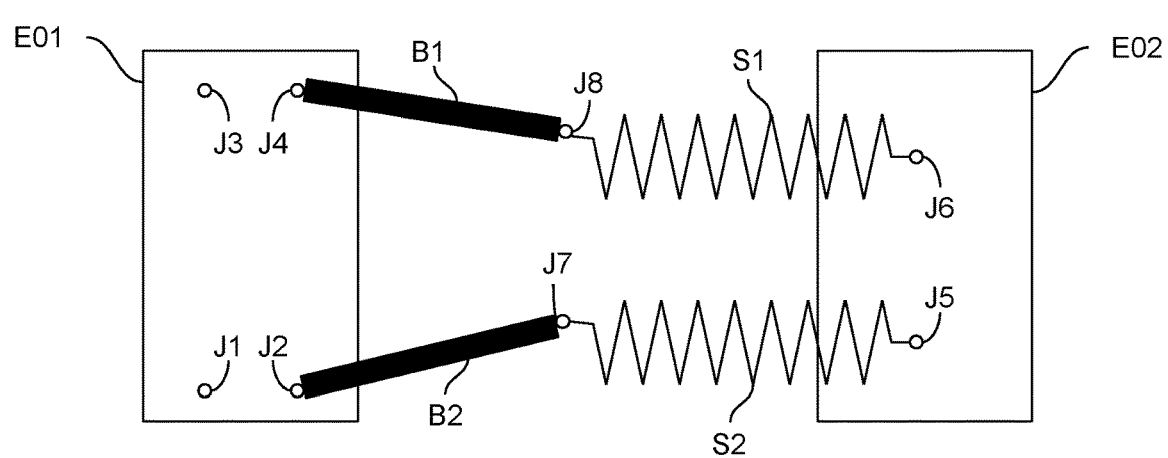
FIG. 2B is an example of one of the design options of FIG. 1, according to various embodiments.

FIG. 2B is an example of one of the design options of FIG. 1, according to various embodiments. As shown, design option 124 includes beam B1 coupled between joints J4 and J8, beam B2 coupled between joints J2 and J7, spring S1 coupled between joints J8 and J6, and spring S2 coupled between joints J7 and J5. The various beams and springs shown, and the particular couplings of those components to specific joints, collectively represent a CAD assembly that may address the engineering problem set forth in problem definition 122, at least to some degree.

To generate design option 124, design engine 120 assigns specific values to the various design variables associated with problem definition 122 to represent specific types of components. For example, design engine 120 could assign a value of "1" to design variable X2 to represent beam B1. Design engine 120 could assign a value of "0" to design variable X3 to indicate the absence of a component. Design engine 120 could assign a value of "2" to design variable X5 to represent spring S2. Design engine 120 may also assign values to other design variables in order to represent the positioning and/or joint type associated with joints J1 through J8, in some embodiments.

Design engine 120 is configured to implement a statistically-driven design process to generate design values for design options 124 in conjunction with generating design data 126, as described in greater detail below in conjunction with FIG. 3.

Software Overview

Figure 3:
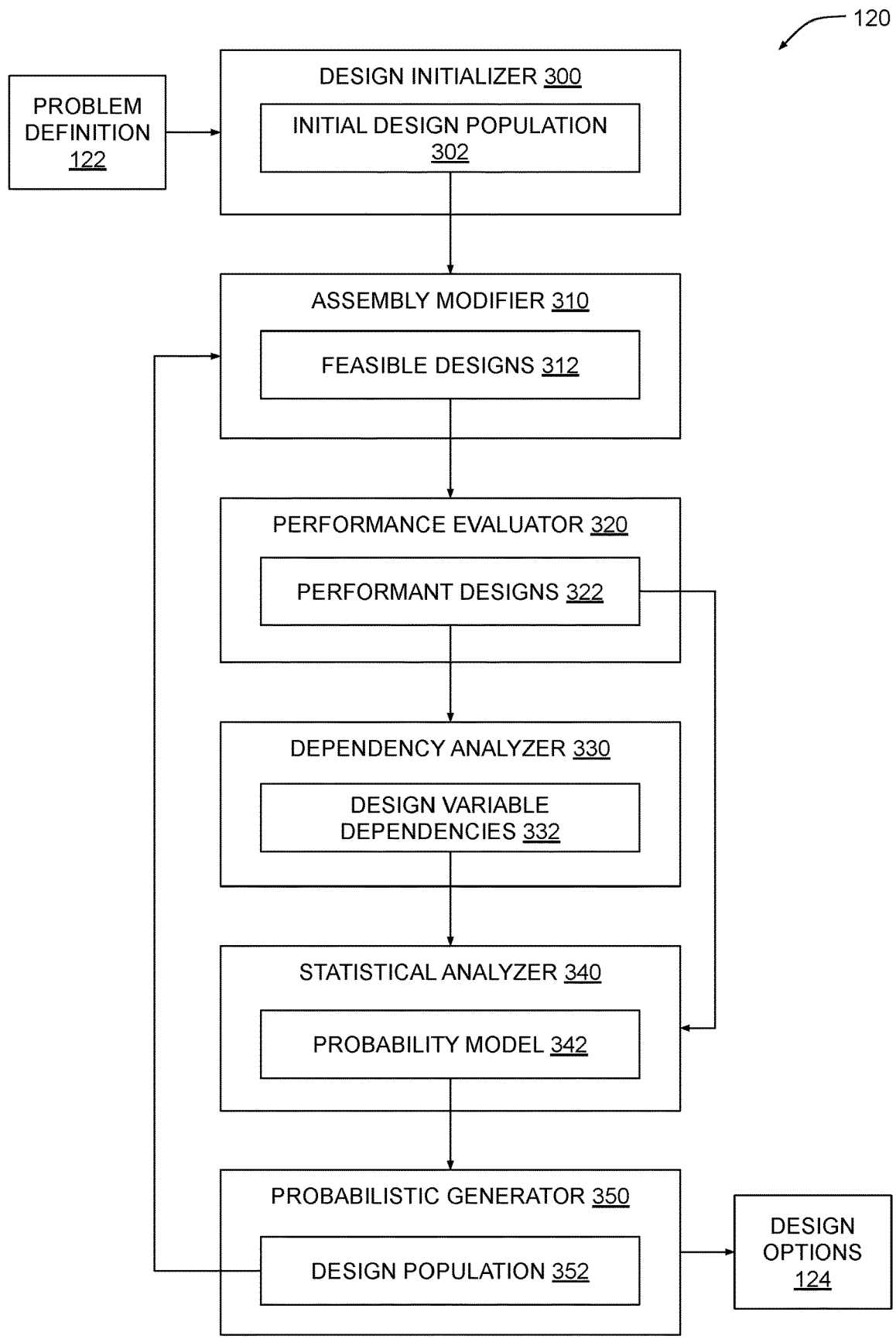
FIG. 3 is a more detailed illustration of the design engine of FIG. 1, according to various embodiments.

FIG. 3 is a more detailed illustration of the design engine of FIG. 1, according to various embodiments. As shown, design engine 120 includes a design initializer 300, an assembly modifier 310, a performance evaluator 320, a dependency analyzer 330, a statistical analyzer 340, and a probabilistic generator 350.

In operation, design initializer 300 generates an initial design population 302 of randomized designs based on problem definition 122. A given design included in initial design population 302 includes a randomly selected or randomly omitted component for each pair of joints set forth in problem definition 122. As mentioned, a given component could be, for example, a beam, spring, a damper, and any other technically feasible mechanical component. Each design included in initial design population 302 also includes a randomly selected joint type for each joint. A given joint type could be, for example, a ball joint, a slider joint, an elbow joint, and so forth. In practice, design initializer 300 generates a given design included in initial design population 302 by assigning random values to each design variable associated with the given design. For example, design initializer 300 could assign a value of "1"

to a given design variable in order to indicate that the corresponding joint should be a ball joint. Similarly, design initializer 300 could assign a value of "2" to another design variable in order to indicate that the corresponding component should be a beam.

Assembly modifier 310 processes each design included in initial design population 302 in order to identify and repair any infeasible designs. Assembly modifier 310 then outputs feasible designs 312 that include any initially feasible designs as well as any repaired designs. As referred to herein, the term "infeasible" is used to describe designs that violate certain design rules. For example, a design for an assembly that includes one or more components that are not attached to joints at both ends could be considered infeasible, because such "dangling" components do not contribute to the overall functionality of the design. In another example, a design for an assembly that includes too many components connected to the same joint could be considered infeasible because a real-world joint can only handle a maximum number of connections. Assembly modifier 310 identifies infeasible designs and then implements a constraint-oriented programming approach to modify those designs. In doing so, assembly modifier 310 implements various techniques described in greater detail below in conjunction with FIGS. 4A-4D to repair infeasible designs.

Performance evaluator 320 simulates the dynamic behavior of feasible designs 312 to generate performance data that indicates the degree to which each feasible design 312 meets the various design objectives set forth in problem definition 122. Performance evaluator 320 ranks feasible designs 312 based on the associated performance data and selects the best-performing designs, which are shown as performant designs 322. Performance evaluator 320 may select the top N performing designs, N being an integer, or select the top N % designs, N being a decimal, among other approaches to selecting the best-performing designs. An example of how performance evaluator 320 selects performant designs 322 is described below in conjunction with FIG. 5.

Dependency analyzer 330 processes each performant design 322 and determines various statistical dependencies between design variables to generate design variable dependencies 332. Dependency analyzer 330 can determine that two design variables depend on one another by comparing the expected probabilities of those two design variables having specific values to the observed probabilities of those two design variables having specific values.

Dependency analyzer 330 can quantify the dependencies between design variables using various statistical approaches. An example of how dependency analyzer 330 generates design variable dependencies 332 is described below in conjunction with FIGS. 6A-6B.

In one embodiment, dependency analyzer 330 may implement a chi-squared test to generate a chi-squared value for a given pair of design variables, where the chi-squared value quantifies the statistical dependency between the given pair of design variables. Dependency analyzer 330 may then determine that a pair of design variables are dependent on one another when the associated chi-squared value exceeds a threshold. Dependency analyzer 330 may also account for missing observations when implementing this approach by selecting different thresholds against which each chi-squared value is compared based on how many observations are missing.

Statistical analyzer 340 analyzes performant designs 322 and design variables dependencies 332 to generate a probability model 342. Conceptually, probability model 332 indicates various probabilities of certain design elements occurring in designs that are considered high-performing. More specifically, probability model 342 includes a set of conditional probability values associated with each pair of design variables that are determined, via dependency analyzer 330, to be statistically dependent on one another. The set of conditional probabilities includes a different conditional probability value for each different combination of values that can be assigned to the pair of design variables. For example, suppose dependency analyzer 330 determines that design variables X1 and X2 are statistically dependent on one another via the approach described previously. Statistical analyzer 340 could generate a set of conditional probability values indicating the probability of design variable X2 being assigned a value of "2" (indicating, e.g., beam component), conditioned on the probability of design variable X2 being assigned a value of "1" (indicating, e.g., a ball joint).

In one embodiment, probability model 342 is a two-dimensional (2D) matrix of values with rows that correspond to "parent" elements and columns that correspond to "child" elements. Parent and child elements correspond to design variables that are determined to be statistically dependent on one another. A given cell included in the 2D matrix of values stores a conditional probability value that indicates the probability of a child design variable being assigned a specific value conditioned on the probability of the parent design variable being assigned a specific value. This particular embodiment is described in greater detail below in conjunction with FIG. 7.

Probabilistic generator 350 is configured to generate design population 352 based on samples extracted from probability model 342. In order to generate a given design included in design population 352, probabilistic generator 350 assigns specific values to the design variables included in the given design with a probability distribution that is derived from probability model 342. In this manner, probabilistic generator 350 can generate new populations of designs that have design variable values derived from high-performing designs included in previous populations of designs. If certain convergence criteria are met, probabilistic generator 350 outputs the newly-generated population of designs as design options 124. Otherwise, probabilistic generator 350 provides design population 352 to assembly modifier 310 and the above-described process repeats. The convergence criteria could indicate, for example, a maximum number of iterations to perform or a maximum amount of time to execute, among others.

In one embodiment, probabilistic generator 350 may implement a Gibbs sampling technique to sample probability model 342 when generating a new design to include in design population 352. In so doing, probabilistic generator 350 randomly assigns values to the various design variables associated with the design and then updates these values based on probability values sampled from probability model 342. By repeating this process across one or more iterations, the values assigned to the design variables may eventually converge to having the probability distribution set forth in probability model 342. This particular embodiment is described in greater detail below in conjunction with FIG. 8.

Via the above operations, design engine 120 estimates probability distributions of design variable values associated with high-performing designs across increasingly performant design populations and then uses these probability distributions to generate subsequent design populations. In practice, this approach can converge quickly to generate design options 124 faster than possible with conventional generative design techniques, such as generative design and constraint-oriented programming techniques, among others. The various operations described above are also described by way of example below in conjunction with FIGS. 4A-8.

Exemplary Software Processing Operations

Figure 4A:
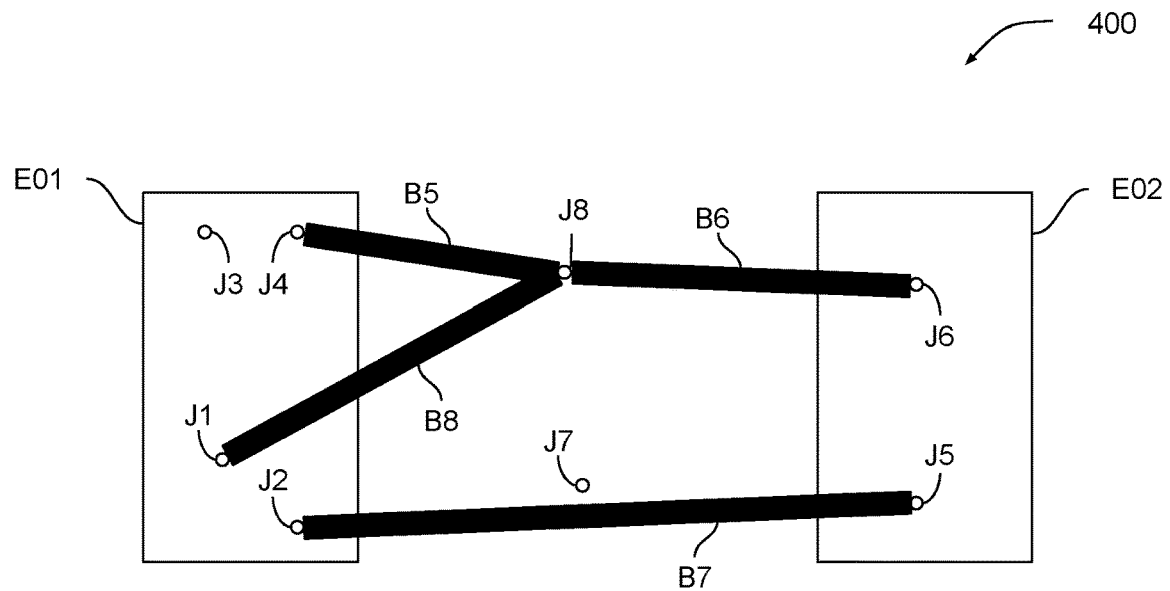
FIGS. 4A-4B set forth a first example of how an infeasible design is repaired, according to various embodiments.
Figure 4B:
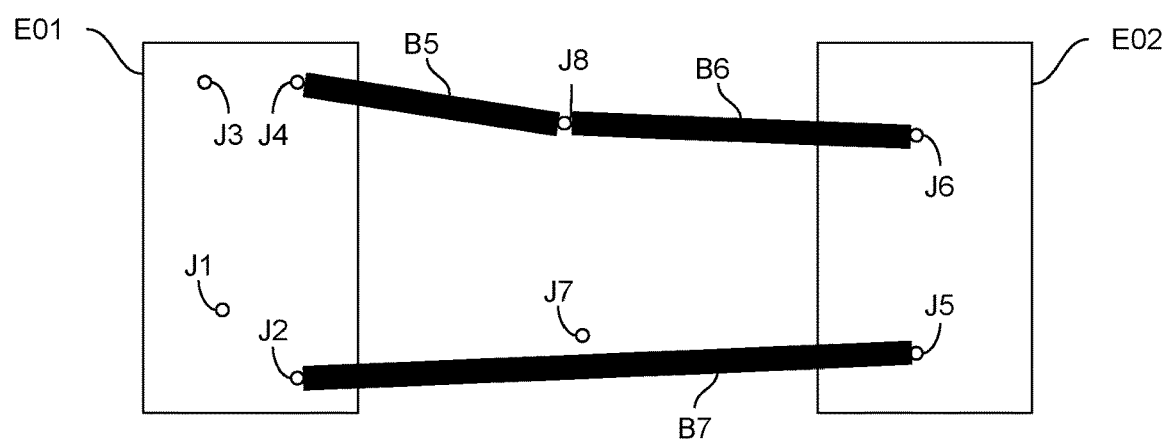

FIGS. 4A-4B set forth a first example of how an infeasible design is repaired, according to various embodiments. As shown in FIG. 4A, a design 400 includes beam B5 coupled between joints J4 and J8, beam B6 coupled between joints J8 and J6, beam B7 coupled between joints J2 and J5, and beam B8 coupled between joints J1 and J8. Design 400 can be included in initial design population 302 or included in a subsequently-generated design population.

Assembly modifier 310 analyzes the structure of design 400 and determines that design 400 is infeasible because too many components are connected to joint J8. Assembly modifier 310 can implement a constraint-oriented programming approach to determine that design 400 violates a constraint indicating that only two components can be coupled to any given joint. In response, assembly modifier 310 removes beam B8, as shown in FIG. 4B, to generate feasible design 312(0).

Figure 4C:
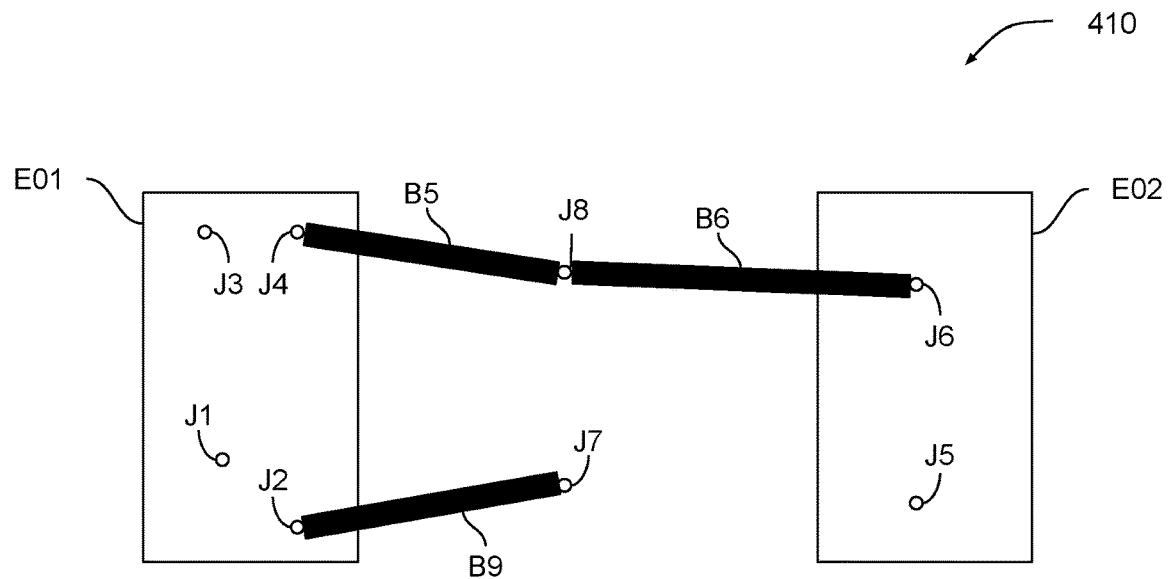
FIGS. 4C-4D set forth a second example of how an infeasible design is repaired, according to various other embodiments.
Figure 4D:
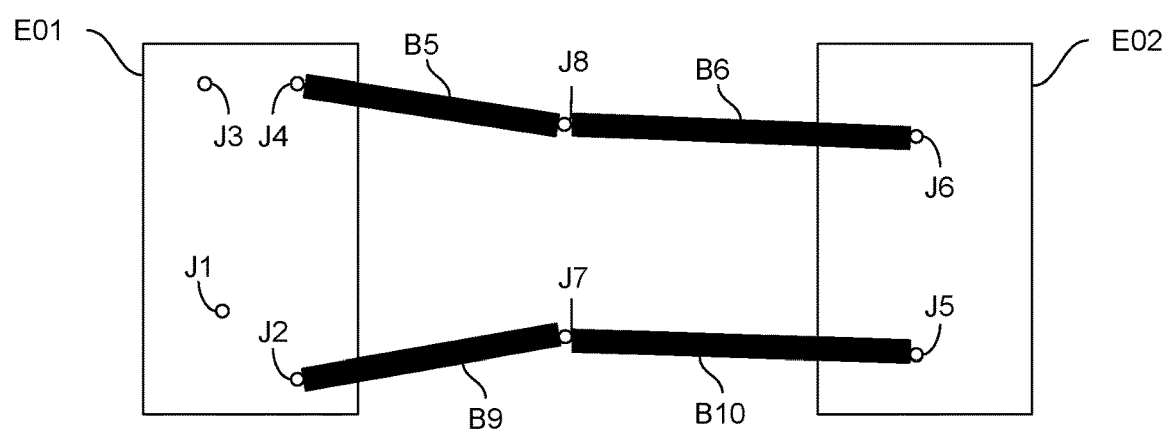

FIGS. 4C-4D set forth a second example of how an infeasible design is repaired, according to various other embodiments. As shown in FIG. 4C, a design 410 includes beam B5 coupled between joints J4 and J8, beam B6 coupled between joints J8 and J6, and beam B9 coupled between joints J2 and J7. Design 410 can be included in initial design population 302 or can be generated via one or more iterations of design engine 120 when generating populations of designs.

Assembly modifier 310 analyzes the structure of design 410 and determines that design 410 is infeasible because beam B9 forms a discontinuous path that does not terminate on any environmental objects. In other words, beam B9 is a "dangling" component. Assembly modifier 310 can implement a constraint-oriented programming approach to determine that design 410 violates a constraint indicating that components cannot project into space without coupling to a joint or an environmental object. In response, assembly modifier 310 adds beam B10, as shown in FIG. 4D, in order to couple beam B9 to EO2.

Referring generally to FIGS. 4A-4D, assembly modifier 310 can perform the above techniques iteratively to add and/or remove design elements from infeasible designs until any violations of design rules are resolved. In so doing, assembly modifier 310 can backtrack designs in the manner commonly associated with constraint-oriented programming. Once assembly modifier 310 generates feasible designs 312, performance evaluator 320 evaluates the performance of those designs, as described in greater detail below.

Figure 5:
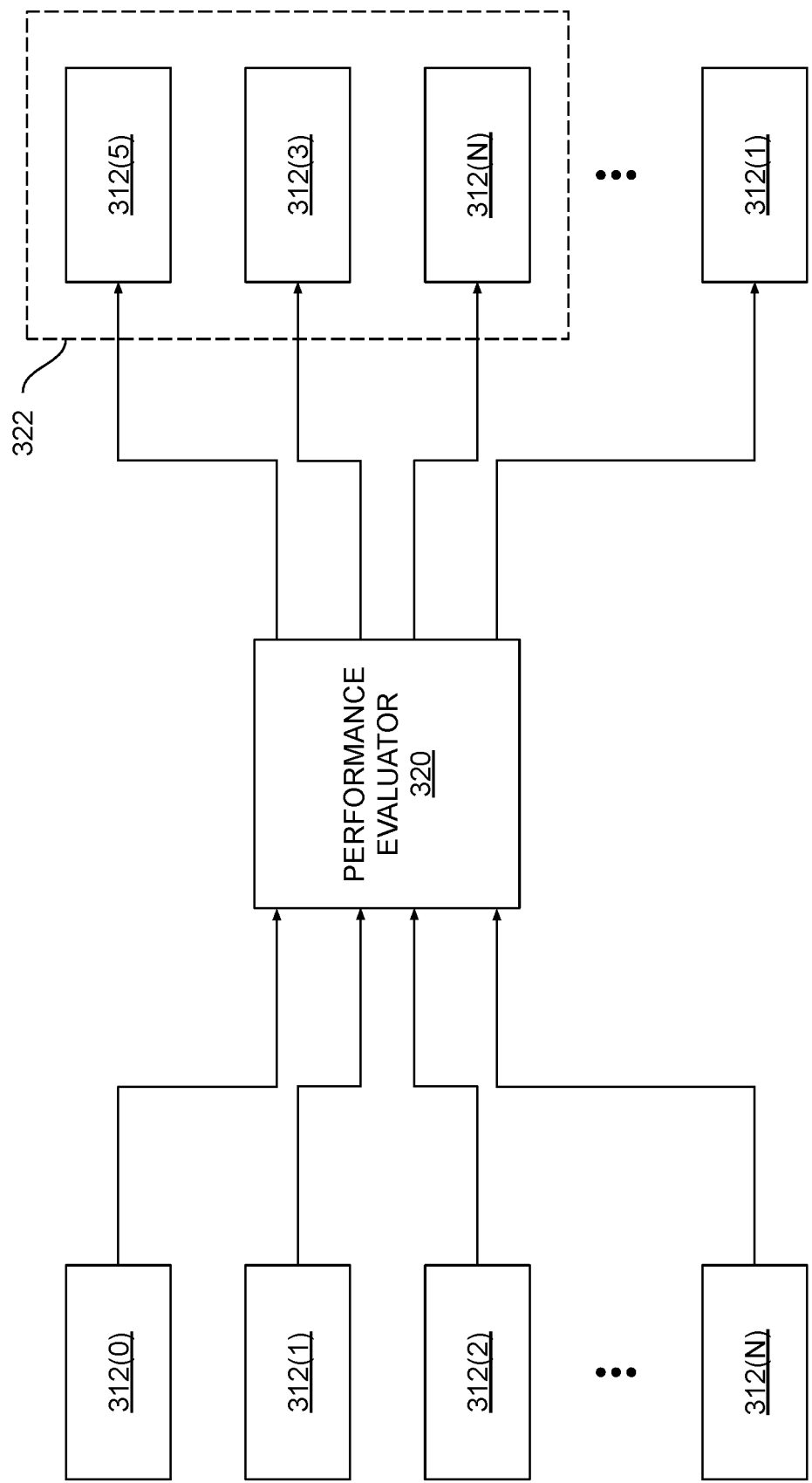
FIG. 5 illustrates how the performance evaluator of FIG. 3 identifies one or more performant designs, according to various embodiments.

FIG. 5 illustrates how the performance evaluator of FIG. 3 identifies one or more performant designs, according to various embodiments. As shown, performance evaluator 320 analyzes feasible designs 312(0) through 312(N) to determine the degree to which each design meets the design objective(s) set forth in problem definition 122. For example, performance evaluator 320 could execute a numerical simulation with each design and then determine how closely the physical dynamics of those designs match a target set of physical dynamics. Performance evaluator 320 then identifies the highest performing designs as performant designs 322. Once performant designs 322 have been identified in this manner, dependency analyzer 330 analyzes dependencies between design variables included in those designs, as described in greater detail below.

Figure 6A:
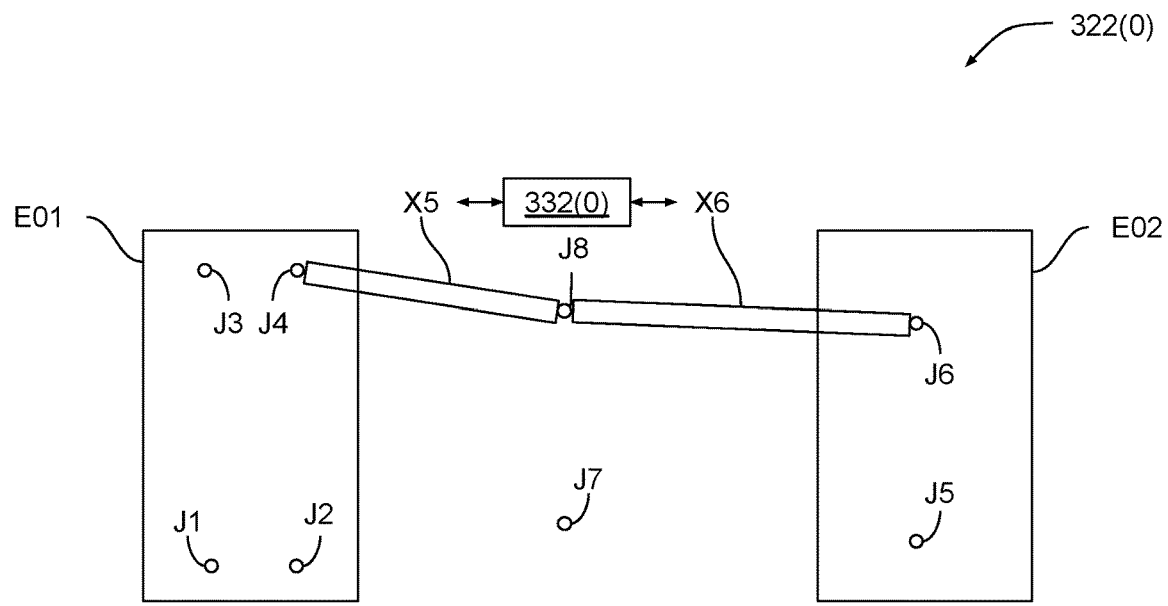
FIGS. 6A-6B illustrate one or more design elements associated with one or more dependent design variables, according to various embodiments.
Figure 6B:
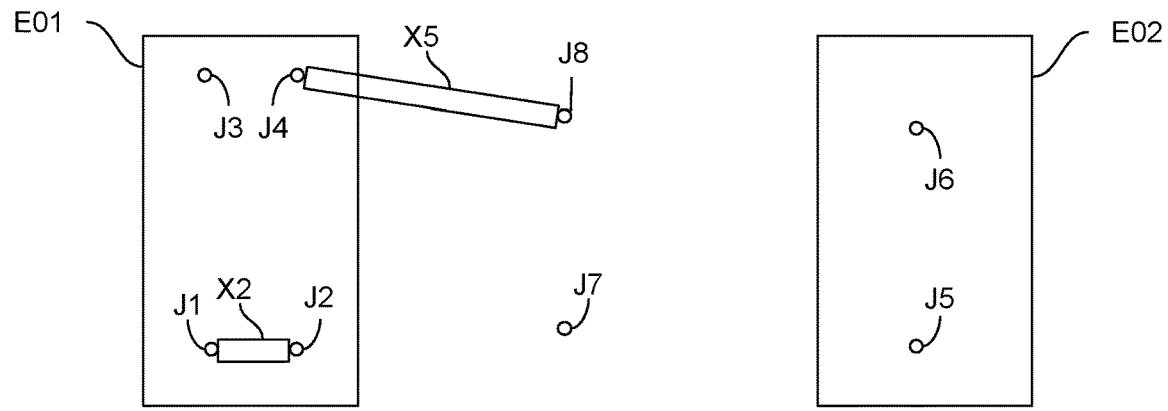

FIGS. 6A-6B illustrate one or more design elements associated with one or more dependent design variables, according to various embodiments. As shown, in FIG. 6A, dependency analyzer 330 determines a design variable dependency 332(0) between design variables X5 and X6. Dependency analyzer 330 could, for example, analyze all performant designs 322 and determine that a large proportion of performant designs 322 include components that couple together joints J4, J8, and J6 in succession. These components may have any particular type, including beams, springs, dampers, and so forth. As discussed above in conjunction with FIG. 3, in one embodiment, dependency analyzer 330 may implement a chi-squared test to identify design variables that are correlated with or dependent on one another based on a distribution of design values assigned to those design variables.

In some cases, certain design variables may not be significantly dependent on one another, as shown in FIG. 6B. In particular, as is shown, design variables X5 and X2 are associated with separate regions of EO1. Dependency analyzer 330 may determine that the values assigned to these design variables across many performant designs 322 vary independently of one another. Based on design variable dependencies 332 and performant designs 312, statistical analyzer 340 performs a statistical analysis of design variables determined to be dependent on one another to generate probability model 342, as described in greater detail below.

FIG. 7 is an example of the probability model of FIG. 3, according to various embodiments. As shown, probability model 342 is a 2D matrix. Probability model 342 includes rows corresponding to different possible values that can be assigned to a design variable X1 and columns corresponding to different possible values that can be assigned to a design variable X2. As previously discussed, each value that can be assigned to a design variable represents a particular component type or joint type.

A given cell of probability model 342 includes a conditional probability of design variable X2 being assigned a specific value conditioned on design variable X1 being assigned a specific value. For example, row X12 of probability model 342 could correspond to design variable X1 being assigned a value of "2" and column X23 could correspond to design variable X2 being assigned a value of "3." Probability value P5 represents the conditional probability of design variable X2 being assigned a value of "3" given that design variable X1 is assigned a value of "2." Because probability model 342 is generated based on dependent design variables that are included in performant designs 322, the distribution of conditional probabilities in probability model 342 describes, from a statistical perspective, how a high-performing design can be structured. Probabilistic generator 350 can generate additional high-performing designs based on probability model 342, as described in greater detail below.

Figure 8:
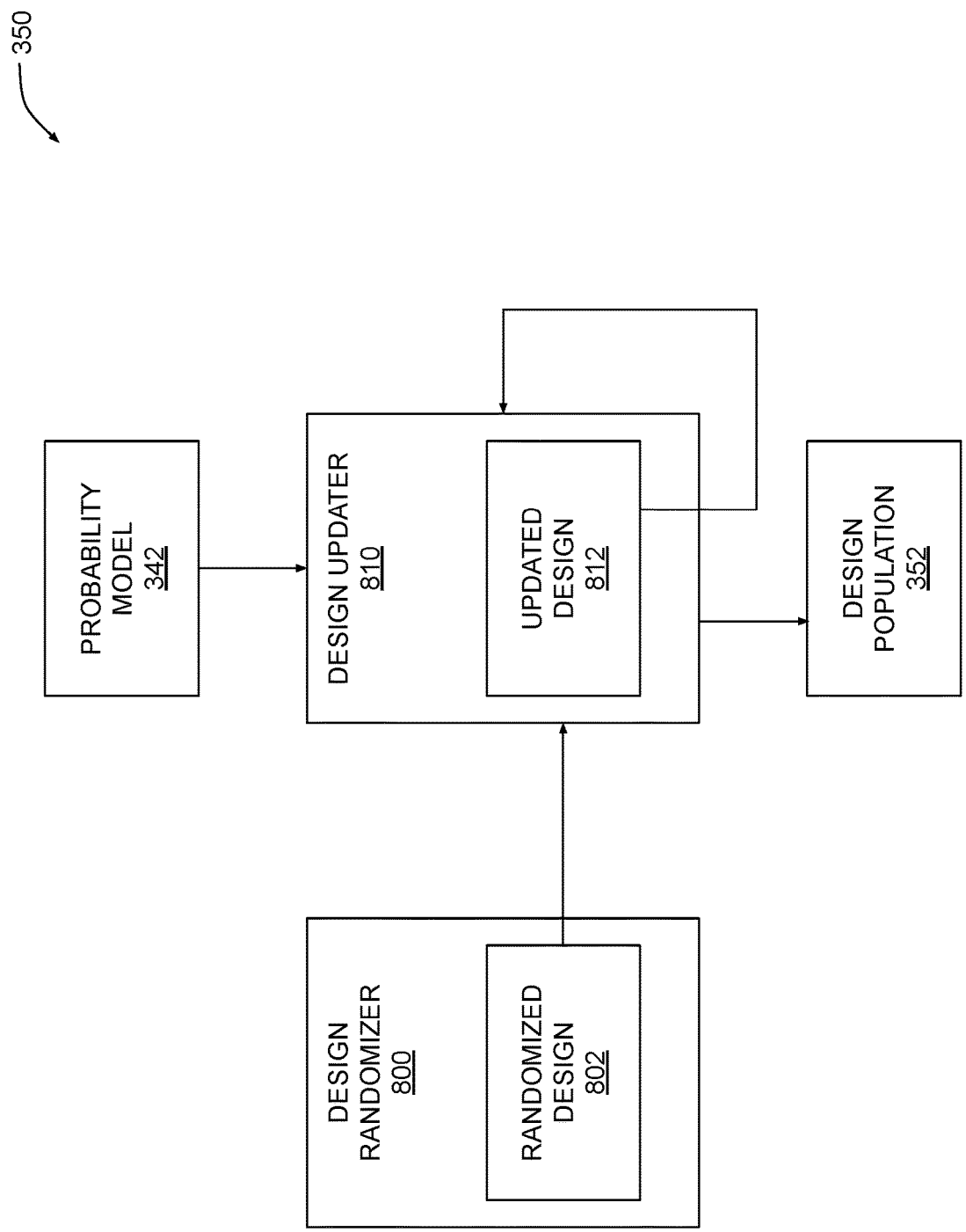
FIG. 8 is a more detailed illustration of the probabilistic generator of FIG. 3, according to various embodiments.

FIG. 8 is a more detailed illustration of the probabilistic generator of FIG. 3, according to various embodiments. As shown, probabilistic generator 350 includes a design randomizer 800 and a design updater 810. In operation, design randomizer 800 generates a randomized design 802 by randomly assigning values to the design variables associated with design problem 122. Design updater 810 then updates randomized design 802, based on samples drawn from probability model 342, to generate an updated design 812. Design updater 810 can repeatedly draw samples from probability model 342 and apply updates in this manner to refine updated design 812. By performing this approach with many randomized designs, design updater 810 generates design population 352. Because design updater 810 updates randomized designs 802 based on probability model 342, design population 352 may have a probability distribution that is similar to probability model 342. In the embodiment described herein, probabilistic generator 350 may implement a technique known in the art as Gibbs sampling.

Referring generally to FIGS. 4A-8, design engine 120 implements the disclosed techniques over one or more iterations until the convergence criteria discussed previously are met. Designs for mechanical assemblies can be generated in this manner faster and/or with fewer iterations than possible with conventional generative design techniques or with conventional constraint-oriented programming techniques. The disclosed techniques are also described in greater detail below in conjunction with FIG. 8.

Process for Generating CAD Assemblies

Figure 9:
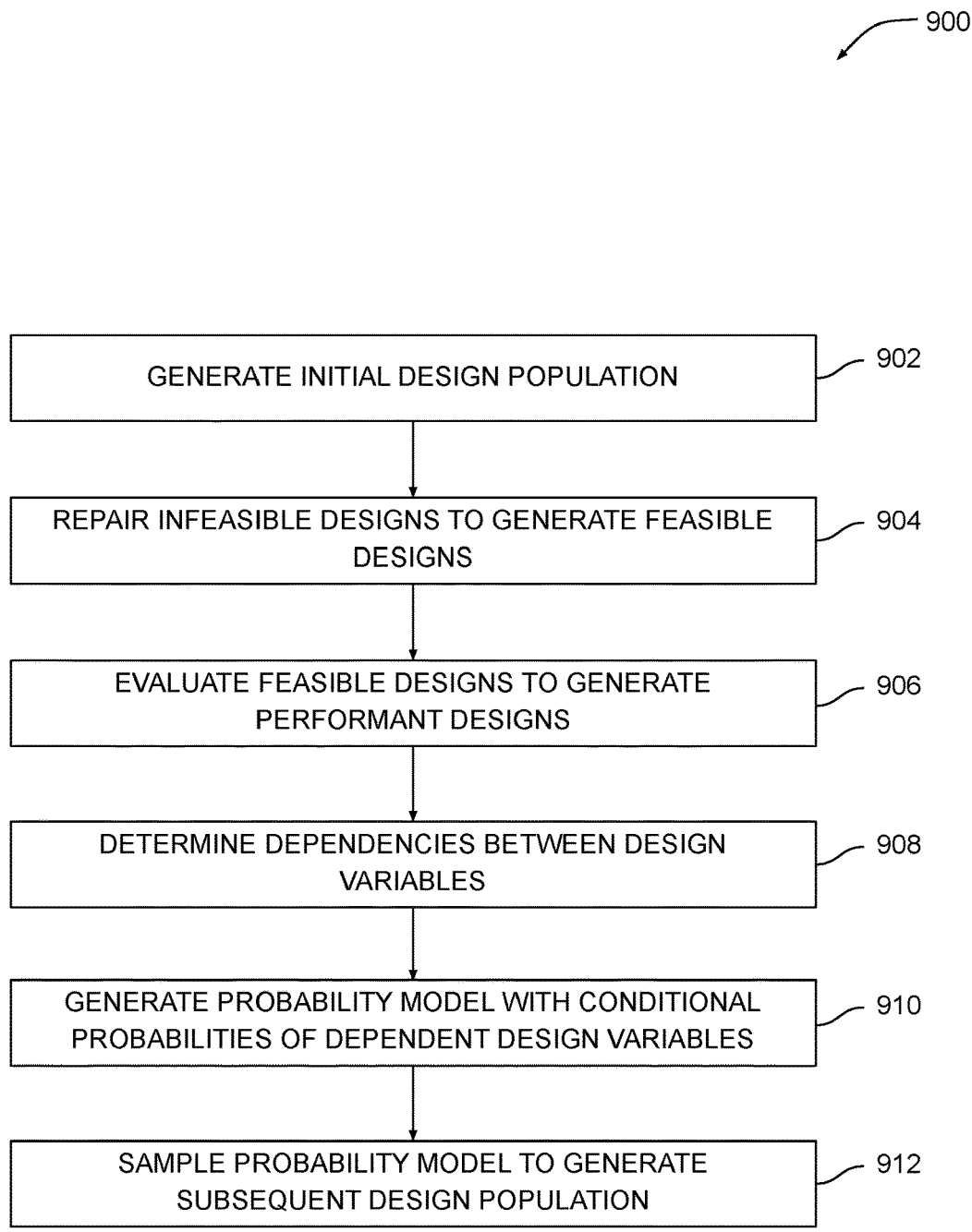
FIG. 9 is a flow diagram of method steps for generating a plurality of designs that address a given design problem, according to various embodiments.

FIG. 9 is a flow diagram of method steps for generating a plurality of designs that address a given design problem, according to various embodiments. Although the method steps are described in conjunction with the systems of FIGS. 1-8, persons skilled in the art will understand that any system configured to perform the method steps in any order falls within the scope of the present embodiments.

As shown, a method 900 begins at step 902, where design initializer 300 within design engine 120 generates an initial design population of randomized designs. Design initializer 300 generates the initial design population based on a problem definition associated with an engineering problem to be addressed. A given design included in the initial design population includes a randomly selected or randomly omitted component for each pair of joints set forth in the problem definition. Design initializer 300 generates a given design included in the initial design population by assigning a random value to each design variable set forth in the problem definition.

At step 904, assembly modifier 310 within design engine 120 repairs any infeasible designs to generate a set of feasible designs. As referred to herein, the term "infeasible" is used to describe designs that violate certain design constraints. Assembly modifier 310 implements a constraint-oriented programming approach to identify designs that violate one or more design constraints, and then generate modifications to those designs to resolve those violations. Assembly modifier 310 can remove components from infeasible designs and/or add components to infeasible designs, in an iterative manner, until those infeasible designs do not violate any design constraints.

At step 906, performance evaluator 320 within design engine 120 evaluates the feasible designs generated at step 904 to generate a set of performant designs. Performance evaluator 320 determines the dynamic behavior of those feasible designs, via the execution of a simulation, to generate performance data indicating the degree to which each feasible design meets one or more design objectives set forth in the problem definition. Performance evaluator 320 ranks the feasible designs based on the associated performance data and selects the best-performing, or performant, designs.

At step 908, dependency analyzer 330 within design engine 120 determines a set of dependencies between design variables associated with the set of performant designs generated at step 906. Dependency analyzer 330 specifically analyzes a set of probabilities associated with design variables included in the design problem. Dependency analyzer 330 can determine that two design variables depend on one another by comparing the expected probabilities of those two design variable having specific values to the observed probabilities of those two design variables having specific values. In one embodiment, dependency analyzer 330 implements a chi-squared test across design variable values set forth in the performant designs generated at step 906 to determine dependencies between design variables.

At step 910, statistical analyzer 340 within design engine 120 generates a probability model that includes a set of conditional probabilities between design variables determined to be dependent on one another at step 908. Probability model 332 indicates various probabilities of certain design elements occurring in designs that are considered high-performing. More specifically, probability model 342 includes a set of conditional probability values associated with each pair of design variables that are determined, via dependency analyzer 330, to be statistically dependent on one another. The set of conditional probabilities includes a different conditional probability value for each different combination of values that can be assigned to the pair of design variables.

At step 912, probabilistic generator 350 within design engine 120 iteratively samples the probability model and updates a set of randomized designs in order to generate a subsequent design population. In order to generate a given design included in the subsequent design population, probabilistic generator 350 assigns specific values to the design variables included in the given design with a probability distribution that is derived from the probability model. In this manner, probabilistic generator 350 can generate new populations of designs that have design variable values derived from high-performing designs included in previous populations of designs. If certain convergence criteria are met, probabilistic generator 350 outputs the newly-generated population of designs as design options. Otherwise, the above-described steps repeat based on the newly-generated population of designs. In one embodiment, probabilistic generator 350 implements Gibbs sampling with the probability model to generate the subsequent design population.

In sum, a design engine implements a probabilistic approach to generating designs for computer-aided design (CAD) assemblies. The design engine initially generates a population of designs based on a problem definition associated with a design problem. Each design includes a randomly-generated set of design values assigned to various design variables. The design engine repairs any infeasible designs in the population of designs and then executes a dynamic simulation with the population of designs. The design engine selects the most performant designs and identifies, based on those performant designs, design variables that are dependent on one another. The design engine generates a probability model indicating conditional probabilities between design values associated with dependent design variables. The design engine then iteratively samples the probability model to generate a subsequent population of designs. In this manner, the design engine can automatically generate designs for mechanical assemblies significantly faster than possible with conventional algorithmic design techniques.

At least one technological advantage of the disclosed techniques relative to the prior art is that complex CAD assemblies that address complex design problems can be automatically generated faster than when generated using conventional algorithmic techniques. Another technological advantage of the disclosed techniques relative to the prior art is that large design spaces associated with complex design problems can be more efficiently explored without consuming the large amounts of time that are typical with conventional algorithmic techniques that oftentimes perform exhaustive design space searches. As a result, the disclosed techniques can be applied to a wider range of design problems than conventional algorithmic techniques. These technological advantages represent one or more technological advancements over prior art approaches.

1. Some embodiments include a computer-implemented method for generating designs that address a design problem, the method comprising generating a first plurality of designs that is based on a problem definition associated with the design problem and includes a first set of design values, generating a first model that indicates a first probability distribution associated with the first set of design values and is based on the first plurality of designs, and generating a second plurality of designs based on one or more samples extracted from the first model, wherein the second plurality of designs includes a greater number of designs that meet a first design objective set forth in the problem definition than the first population of designs.

2. The computer-implemented method of clause 1, wherein generating the first plurality of designs comprises assigning a first subset of design values to a first set of design variables associated with the problem definition.

3. The computer-implemented method of any of clauses 1-2, wherein a first design included in the first plurality of designs comprises three-dimensional geometry associated with a mechanical assembly, and wherein a first design variable included in the first subset of design variables corresponds to either a first mechanical joint or a first mechanical component included in the mechanical assembly.

4. The computer-implemented method of any of clauses 1-3, wherein the first subset of design values includes a first design value that is assigned to a first design variable, and wherein the first design value corresponds to either a first type of mechanical joint associated with the first mechanical joint or a first type of mechanical component associated with the first mechanical component.

5. The computer-implemented method of any of clauses 1-4, wherein generating the first model comprises executing a dynamics simulation with the first plurality of designs to generate performance data, ranking the first plurality of designs based on the performance data, selecting a highly-ranked subset of designs from the first plurality of designs, and generating the first probability distribution based on the highly-ranked subset of designs.

6. The computer-implemented method of any of clauses 1-5, wherein the performance data indicates, for a given design included in the first plurality of designs, a degree to which the given design meets the first design objective.

7. The computer-implemented method of any of clauses 1-6, wherein generating the first model comprises determining a first statistical dependency between a first design variable and a second design variable that are included in the problem definition, and generating a first probability value based on a first subset of design values that can be assigned to the first design variable and a second subset of design values that can be assigned to the second design variable.

8. The computer-implemented method of any of clauses 1-7, wherein determining the first statistical dependency between the first design variable and the second design variable comprises executing a chi-squared test to generate a first chi-squared value based on the first subset of design values and the second subset of design values, and determining that the first chi-squared value exceeds a first threshold.

9. The computer-implemented method of any of clauses 1-8, wherein the first statistical dependency exceeds a first threshold that is based on a number of design values included in the first subset of design values and a number of design values included in the second subset of design values.

10. The computer-implemented method of any of clauses 1-9, wherein generating the first probability value comprises determining a first conditional probability that the first design variable is to be assigned a first design value given that the second design variable has been assigned a second design value.

11. Some embodiments include a non-transitory computer-readable medium storing program instructions that, when executed by a processor, cause the processor to generate designs that address a design problem by performing the steps of generating a first plurality of designs that is based on a problem definition associated with the design problem and includes a first set of design values, generating a first model that indicates a first probability distribution associated with the first set of design values and is based on the first plurality of designs, and generating a second plurality of designs based on one or more samples extracted from the first model, wherein the second plurality of designs includes a greater number of designs that meet a first design objective set forth in the problem definition than the first population of designs.

12. The non-transitory computer-readable medium of clause 11, wherein the step of generating the first plurality of designs comprises assigning a first subset of design values to a first set of design variables associated with the problem definition.

13. The non-transitory computer-readable medium of any of clauses 11-12, wherein a first design included in the first plurality of designs comprises three-dimensional geometry associated with a mechanical assembly, and wherein a first design variable included in the first subset of design variables corresponds to either a first mechanical joint or a first mechanical component included in the mechanical assembly.

14. The non-transitory computer-readable medium of any of clauses 11-13, wherein the first subset of design values includes a first design value that is assigned to a first design variable, and wherein the first design value corresponds to either a first type of mechanical joint associated with the first mechanical joint or a first type of mechanical component associated with the first mechanical component.

15. The non-transitory computer-readable medium of any of clauses 11-14, wherein the step of generating the first model comprises executing a dynamics simulation with the first plurality of designs to generate performance data, ranking the first plurality of designs based on the performance data, selecting a highly-ranked subset of designs from the first plurality of designs, and generating the first probability distribution based on the highly-ranked subset of designs.

16. The non-transitory computer-readable medium of any of clauses 11-15, wherein the performance data indicates, for a given design included in the first plurality of designs, a degree to which the given design meets the first design objective.

17. The non-transitory computer-readable medium of any of clauses 11-16, wherein the step of generating the second plurality of designs comprises randomly assigning a first subset of design values to a first set of design variables associated with the problem definition, and iteratively updating the first subset of design values based on one or more samples extracted from the first model.

18. The non-transitory computer-readable medium of any of clauses 11-17, wherein the second plurality of designs includes a second set of design variables, and wherein the first probability distribution is also associated with the second set of design values.

19. The non-transitory computer-readable medium of any of clauses 11-18, wherein the step of generating the second plurality of designs comprises executing Gibbs sampling based on the first model to generate a second set of designs included in the second plurality of designs.

20. Some embodiments include a system, comprising a memory storing a software application, and a processor that, when executing the software application, is configured to perform the steps of generating a first plurality of designs that is based on a problem definition associated with the design problem and includes a first set of design values, generating a first model that indicates a first probability distribution associated with the first set of design values and is based on the first plurality of designs, and generating a second plurality of designs based on one or more samples extracted from the first model, wherein the second plurality of designs includes a greater number of designs that meet a first design objective set forth in the problem definition than the first population of designs.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs that address a design problem, the method comprising:
    generating a first plurality of designs that is based on a problem definition associated with the design problem, wherein each design included in the first plurality of designs is based on a different set of design values assigned to a first set of design variables;
    generating a first probability model that indicates a first probability distribution of first design values assigned to the first set of design variables for a first subset of designs included in the first plurality of designs; and
    generating a second plurality of designs by assigning second design values to the first set of design variables for each design included in the second plurality of designs, wherein the second design values are iteratively sampled from the first probability model according to a first sampling algorithm, and wherein the second plurality of designs includes a greater number of designs that meet a first design objective set forth in the problem definition than the first plurality of designs.

2. The computer-implemented method of claim 1, wherein generating the first plurality of designs comprises assigning a first subset of design values to the first set of design variables associated with the problem definition.

3. The computer-implemented method of claim 2, wherein a first design included in the first plurality of designs comprises three-dimensional geometry associated with a mechanical assembly, and wherein a first design variable included in a first subset of design variables corresponds to either a first mechanical joint or a first mechanical component included in the mechanical assembly.

4. The computer-implemented method of claim 2, wherein the first subset of design values includes a third design value that is assigned to a first design variable, and wherein the third design value corresponds to either a first type of mechanical joint associated with the first mechanical joint or a first type of mechanical component associated with the first mechanical component.

5. The computer-implemented method of claim 1, wherein generating the first probability model comprises:
   executing a dynamics simulation with the first plurality of designs to generate performance data;
   ranking the first plurality of designs based on the performance data;
   selecting a highly-ranked subset of designs from the first plurality of designs; and
   generating the first probability distribution based on the highly-ranked subset of designs.

6. The computer-implemented method of claim 5, wherein the performance data indicates, for a given design included in the first plurality of designs, a degree to which the given design meets the first design objective.

7. The computer-implemented method of claim 1, wherein generating the first probability model comprises:
   determining a first statistical dependency between a first design variable and a second design variable that are included in the problem definition; and
   generating a first probability value based on a first subset of design values that can be assigned to the first design variable and a second subset of design values that can be assigned to the second design variable.

8. The computer-implemented method of claim 7, wherein determining the first statistical dependency between the first design variable and the second design variable comprises:
   executing a chi-squared test to generate a first chi-squared value based on the first subset of design values and the second subset of design values; and
   determining that the first chi-squared value exceeds a first threshold.

9. The computer-implemented method of claim 7, wherein the first statistical dependency exceeds a first threshold that is based on a number of design values included in the first subset of design values and a number of design values included in the second subset of design values.

10. The computer-implemented method of claim 7, wherein generating the first probability value comprises determining a first conditional probability that the first design variable is to be assigned a first design value given that the second design variable has been assigned a second design value.

11. One or more non-transitory computer-readable media storing program instructions that, when executed by one or more processors, cause the one or more processors to generate designs that address a design problem by performing the steps of:
   generating a first plurality of designs that is based on a problem definition associated with the design problem, wherein each design included in the first plurality of designs is based on a different set of design values assigned to a first set of design variables;
   generating a first probability model that indicates a first probability distribution of first design values assigned to the first set of design variables for a first subset of designs included in the first plurality of designs; and
   generating a second plurality of designs by assigning second design values to the first set of design variables for each design included in the second plurality of designs, wherein the second design values are iteratively sampled from the first probability model according to a first sampling algorithm, and wherein the second plurality of designs includes a greater number of designs that meet a first design objective set forth in the problem definition than the first plurality of designs.

12. The one or more non-transitory computer-readable media of claim 11, wherein the step of generating the first plurality of designs comprises assigning a first subset of design values to the first set of design variables associated with the problem definition.

13. The one or more non-transitory computer-readable media of claim 12, wherein a first design included in the first plurality of designs comprises three-dimensional geometry associated with a mechanical assembly, and wherein a first design variable included in a first subset of design variables corresponds to either a first mechanical joint or a first mechanical component included in the mechanical assembly.

14. The one or more non-transitory computer-readable media of claim 12, wherein the first subset of design values includes a third design value that is assigned to a first design variable, and wherein the third design value corresponds to either a first type of mechanical joint associated with the first mechanical joint or a first type of mechanical component associated with the first mechanical component.

15. The one or more non-transitory computer-readable media of claim 11, wherein the step of generating the first probability model comprises:
   executing a dynamics simulation with the first plurality of designs to generate performance data;
   ranking the first plurality of designs based on the performance data;
   selecting a highly-ranked subset of designs from the first plurality of designs; and
   generating the first probability distribution based on the highly-ranked subset of designs.

16. The one or more non-transitory computer-readable media of claim 15, wherein the performance data indicates, for a given design included in the first plurality of designs, a degree to which the given design meets the first design objective.

17. The one or more non-transitory computer-readable media of claim 11, wherein the step of generating the second plurality of designs comprises:
   randomly assigning a first subset of design values to the first set of design variables associated with the problem definition; and
   iteratively updating the first subset of design values based on one or more samples extracted from the first probability model.

18. The one or more non-transitory computer-readable media of claim 11, wherein the second plurality of designs includes a second set of design variables, and wherein the first probability distribution is also associated with the second set of design values.

19. The one or more non-transitory computer-readable media of claim 11, wherein the step of generating the second plurality of designs comprises executing Gibbs sampling based on the first probability model to generate a second set of designs included in the second plurality of designs.

20. A system, comprising:
a memory storing a software application; and
a processor that, when executing the software application, is configured to perform the steps of:
generating a first plurality of designs that is based on a problem definition associated with the design problem, wherein each design included in the first plurality of designs is based on a different set of design values assigned to a first set of design variables,
generating a first probability model that indicates a first probability distribution of first design values assigned to the first set of design variables for a first subset of designs included in the first plurality of designs, and
generating a second plurality of designs by assigning second design values to the first set of design variables for each design included in the second plurality of designs, wherein the second design values are iteratively sampled from the first probability model according to a first sampling algorithm, and wherein the second plurality of designs includes a greater number of designs that meet a first design objective set forth in the problem definition than the first plurality of designs.

* * * * *